United States Patent
Kim et al.

(10) Patent No.: US 9,591,368 B2
(45) Date of Patent: Mar. 7, 2017

(54) DISPLAY APPARATUS AND CONTROL METHOD THEREOF

(71) Applicant: SAMSUNG ELECTRONICS CO., LTD., Suwon-si (KR)

(72) Inventors: Mun-seok Kim, Hwaseong-si (KR); Kyung-chul Nam, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/495,267

(22) Filed: Sep. 24, 2014

(65) Prior Publication Data

US 2015/0089544 A1     Mar. 26, 2015

Related U.S. Application Data (60) Provisional application No. 61/882,256, filed on Sep. 25, 2013.

(30) Foreign Application Priority Data

May 28, 2014 (KR) .................. 10-2014-0064289

(51) Int. Cl.
H04N 21/482 (2011.01)
H04N 21/472 (2011.01)
(Continued)

(52) U.S. Cl.
CPC ....... *H04N 21/482* (2013.01); *H04N 21/4334* (2013.01); *H04N 21/4622* (2013.01); *H04N 21/47214* (2013.01)

(58) Field of Classification Search
CPC . H04N 21/472; H04N 21/482; H04N 21/4828
(Continued)

(56) References Cited

U.S. PATENT DOCUMENTS

2005/0152299 A1   7/2005   Stephens
2007/0101370 A1*  5/2007   Calderwood ............... 725/47
(Continued)

FOREIGN PATENT DOCUMENTS

JP    2011-223128 A    11/2011
KR    10-2005-0056619 A    6/2005
(Continued)

OTHER PUBLICATIONS

Dvb: "Digital Video Broadcasting (DVB); Specification for Service Information (SI) in DVB systems DVB, Document A38", Jan. 31, 2011 (Jan. 31, 2011), pp. 1-157, XP055053275, Retrieved from the Internet: URL : http://www.dvb.org/technology/standards/a038_DVBSI_dEN300468v1.12.1.pdf.
(Continued)

*Primary Examiner* — John Schnurr
(74) *Attorney, Agent, or Firm* — Sughrue Mion, PLLC (57) ABSTRACT

A display apparatus and a control method thereof are provided. The display apparatus includes a signal receiver configured to receive a broadcasting signal that includes content of a channel and information about content overlapped channels, a signal processor configured to extract the content and the information about the content overlapped channels from the received broadcasting signal, a display configured to display an image of an extracted content, and a controller configured to perform a control operation based on the extracted information about the content overlapped channels.

27 Claims, 10 Drawing Sheets

| RESOLUTION (RESOLUTION FIELD) | DESCRIPTION |
|---|---|
| 0 | RESERVED |
| 1 | HD CHANNEL(NO OVERLAPPED CHANNEL) |
| 2 | HD CHANNEL (SD PRESENCE OF OVERLAPPED CHANNEL) |
| 3 | SD CHANNEL(NO OVERLAPPED CHANNEL) |
| 4 | SD CHANNEL (HD PRESENCE OF OVERLAPPED CHANNEL) |
| 5 | UHD CHANNEL(NO OVERLAPPED CHANNEL WITH REGARD TO SD AND HD) |
| 6 | UHD CHANNEL(PRESENCE OF OVERLAPPED CHANNEL WITH REGARD TO SD OR HD) |
| 7~15 | RESERVED |

(51) Int. Cl.
*H04N 21/433* (2011.01)
*H04N 21/462* (2011.01)

(58) Field of Classification Search
USPC .......................................... 725/37, 38, 48, 49
See application file for complete search history.

(56) References Cited

U.S. PATENT DOCUMENTS

| | | | |
|---|---|---|---|
| 2007/0101385 A1* | 5/2007 | Jun | 725/112 |
| 2007/0110167 A1 | 5/2007 | Kim | |
| 2007/0157263 A1* | 7/2007 | Horii | H04H 60/18 725/87 |
| 2009/0075653 A1 | 3/2009 | Yeom | |
| 2010/0118197 A1* | 5/2010 | Kim | 348/570 |
| 2010/0263003 A1 | 10/2010 | Gupta et al. | |
| 2010/0303145 A1 | 12/2010 | Nambiath et al. | |
| 2011/0102683 A1* | 5/2011 | Josephs | H04N 21/23439 348/731 |
| 2012/0079550 A1* | 3/2012 | Hirota | H04H 60/82 725/118 |

FOREIGN PATENT DOCUMENTS

| | | |
|---|---|---|
| KR | 10-2009-0018361 A | 2/2009 |
| KR | 10-2010-0031845 A | 3/2010 |
| KR | 10-2010-0107141 A | 10/2010 |
| KR | 10-2010-0130048 A | 12/2010 |
| KR | 10-2013-0061820 A | 6/2013 |

OTHER PUBLICATIONS

Communication from the European Patent Office issued Dec. 5, 2014, in a counterpart European Application No. 14184715.2.
Communication from the Korean Intellectual Property Office dated Feb. 12, 2015, in a counterpart Korean application No. 10-2014-0064289.
International Search Report for PCT/KR2014/008747 dated Jan. 20, 2015 [PCT/ISA/210].
Communication dated Nov. 6, 2015 issued by the Korean Intellectual Property Office in counterpart Korean Patent Application No. 10-2014-0064289.
Communication dated Aug. 25, 2015 issued by the Korean Intellectual Property Office in counterpart Korean Patent Application No. 10-2014-0064289.
Communication dated Feb. 8, 2016 issued by European Patent Office in counterpart European Patent Application No. 14184715.2.
Communication dated Jun. 30, 2016 issued by European Patent Office in counterpart European Patent Application No. 14184715.2.

* cited by examiner

| SYNTAX | BIT NUMBER | CODE |
|---|---|---|
| cable_virtual_channel_table_section(){ | | |
|     table_id | 8 | 0xC9 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for(i=0;i<N;i++){ | | |
|         descriptor() | | |
|     } | | |
| } | | |
|     reserved | 6 | '111111' |
|     additional_descriptors_length | 10 | uimsbf |
|     for(j+0;j<n;j++){ | | |
|         additional_descriptor() | | |
|     } | | |
|     CRC_32 | 32 | rpchof |
| } | | |

FIG. 5

| SYNTAX | BIT NUMBER | CODE |
|---|---|---|
| ATSC_private_information_descriptor (){ | | |
|     descriptor_tag | 8 | 0×AD |
|     descriptor_length | 8 | 0×09 |
|     format_identifier | 32 | 0×54544130 |
|     private_info_count | 8 | 0×01 |
|     for(i=0;i<private_info_count;i++){ | | |
|         private_info_type | 8 | 0×02 |
|         private_info_length | 8 | 0×02 |
|         ch_frequency_version_number | 8 | uimsbf |
|         channel_mode | 4 | uimsbf |
|         resolution | 4 | uimsbf |
|     } | | |
| } | | |

FIG. 6

| RESOLUTION (RESOLUTION FIELD) | DESCRIPTION |
|---|---|
| 0 | RESERVED |
| 1 | HD CHANNEL(NO OVERLAPPED CHANNEL) |
| 2 | HD CHANNEL (SD PRESENCE OF OVERLAPPED CHANNEL) |
| 3 | SD CHANNEL(NO OVERLAPPED CHANNEL) |
| 4 | SD CHANNEL (HD PRESENCE OF OVERLAPPED CHANNEL) |
| 5 | UHD CHANNEL(NO OVERLAPPED CHANNEL WITH REGARD TO SD AND HD) |
| 6 | UHD CHANNEL(PRESENCE OF OVERLAPPED CHANNEL WITH REGARD TO SD OR HD) |
| 7~15 | RESERVED |

FIG. 7

| RESOLUTION (RESOLUTION FIELD) | DESCRIPTION |
|---|---|
| 0 | RESERVED |
| 1 | SD CHANNEL(NO OVERLAPPED CHANNEL) |
| 2 | SD CHANNEL (PRESENCE OF OVERLAPPED CHANNEL CORRESPONDING TO HIGHER RESOLUTION) |
| 3 | HD CHANNEL(NO OVERLAPPED CHANNEL) |
| 4 | HD CHANNEL (PRESENCE OF OVERLAPPED CHANNEL CORRESPONDING TO HIGHER RESOLUTION) |
| 5 | UHD CHANNEL(NO OVERLAPPED CHANNEL) |
| 5~15 | RESERVED |

DISPLAY APPARATUS AND CONTROL METHOD THEREOF

CROSS-REFERENCE TO RELATED APPLICATION

This application claims priority from U.S. Provisional Application No. 61/882,256, filed on Sep. 25, 2013 in the United States Patent and Trademark Office, and Korean Patent Application No. 10-2014-0064289, filed on May 28, 2014 in the Korean Intellectual Property Office, the disclosures of which are incorporated herein by reference in their entirety.

BACKGROUND

Field

Apparatuses and methods consistent with the exemplary embodiments relate to a display apparatus and a control method thereof, and more particularly, to a display apparatus that can receive a broadcasting signal and display an image corresponding to content, and a control method thereof.

Description of Related Art

A display apparatus such as a television (TV) may receive a broadcasting signal including content such as drama, news, video on demand, (VOD), and the like. The display apparatus may extract the content from the received broadcasting signal and thereby display an image of the extracted content.

The display apparatus receives a broadcasting signal corresponding to a channel selected by a user from among a plurality of broadcasting signals corresponding to the plurality of channels that are received from a broadcasting station. In some instances, two or more channels corresponding to the broadcasting signal received by the display apparatus may overlap with each other. For example, first content extracted from the broadcasting signal of a first channel and second content extracted from the broadcasting signal of a second channel may be the same content but different in a video format such as resolution, and the like. Hereinafter, two or more channels that overlap are referred to as overlapped or overlapping channels.

A broadcasting signal typically does not include information about overlapped channels, and thus, the display apparatus is not able to provide information about the overlapped channels. That is, a user does not know that there are overlapped channels until the user selects the corresponding channel. If the display apparatus can be tuned to the overlapped channels, the display apparatus may store the corresponding overlapped channels as a tunable channel during an automatic channel seeking process. However, it is inconvenient for a user because the user may repetitively encounter two or more overlapped channels that have the same content during the channel seeking process.

To solve such a problem of the overlapped channels, the display apparatus may determine whether a requested channel is an overlapped channel based on information about the content. However, this determination is not reliable because information that is obtained by the display apparatus may vary depending on current conditions or the like for receiving the broadcasting signal.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide a display apparatus that may provide information about overlapped channels and that may operate based on information about the overlapped channels to thereby improve a user's convenience, and a control method thereof.

In addition, one or more exemplary embodiments provide a display apparatus that can more reliably determine channels that have content that is overlapped, and a control method thereof.

According to an aspect of an exemplary embodiment, there is provided a display apparatus including a signal receiver configured to receive a broadcasting signal, which includes a content of a channel and information about content overlapped channels, a signal processor configured to extract the content and the information about the content overlapped channels from the received broadcasting signal, a display configured to display an image of an extracted content, and a controller configured to perform a predetermined control operation based on the extracted information about the content overlapped channels.

The control operation may include generating a channel configuration including information about at least two of the content overlapped channels. Thus, the display apparatus may prevent a user from unnecessarily selecting the overlapped channels, thereby improving a user's convenience.

The control operation may include controlling the display to display a user interface that includes information about at least two of the content overlapped channels. Thus, the display apparatus may inform a user of the information about the overlapped channels, thereby improving a user's convenience.

The control operation may include scheduling a recording operation with regard to one channel from among at least two of the content overlapped channels. Thus, the display apparatus may operate based on the information about the overlapped channel when the scheduled recording is implemented, thereby improving a user's convenience with regard to the scheduled recording.

The information about the content overlapped channels may be a value assigned to a predetermined data field included in the broadcasting signal. Thus, the display apparatus may use the information about the content overlapped channels assigned to the value of the predetermined data field embedded in the broadcasting signal, thereby more effectively determining the content overlapped channels.

The information about the content overlapped channels may include information about a presence of content overlapped channels that are different in resolution from each other. Thus, the display apparatus may determine the content overlapped channels different in resolution with regard to the same contents, thereby allowing a user not to unnecessarily select a channel corresponding to undesired resolution, or allowing a user to select and view a channel corresponding to desired resolution.

The presence of the content overlapped channels may include a presence of a content overlapped channel that has a higher resolution than a current channel. Thus, the display apparatus may determine the presence of the content overlapped channels in accordance with a predetermined rule such as the presence of the higher resolution with regard to the current resolution, so that only few resolution fields can be enough to determine the content overlapped information. Therefore, it is possible to efficiently provide information about the content overlapped channels without lack of the resolution fields even though the number of channels different in resolution is increased.

According to an aspect of another exemplary embodiment, there is provided a control method of a display apparatus, the method including receiving a broadcasting signal that includes content of a channel and information about content overlapped channels, extracting the content and the information about the content overlapped channels from the received broadcasting signal, displaying an image of the extracted content, and performing a predetermined control operation based on the extracted information about the content overlapped channels.

The control operation may include generating a channel configuration including information about at least two of the content overlapped channels.

The control operation may include displaying a user interface that includes information about at least two of the content overlapped channels.

The control operation may include scheduling a recording operation with regard to one channel from among at least of the two content overlapped channels.

The information about the content overlapped channels may be a value assigned to a predetermined data field included in the broadcasting signal.

The information about the content overlapped channels may include information about a presence of content overlapped channels that are different in resolution from each other.

The presence of the content overlapped channels may include a presence of a content overlapped channel that has a higher resolution than a current channel.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

The exemplary embodiments described herein in greater detail with reference to the accompanying drawings. Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

Figure 1:
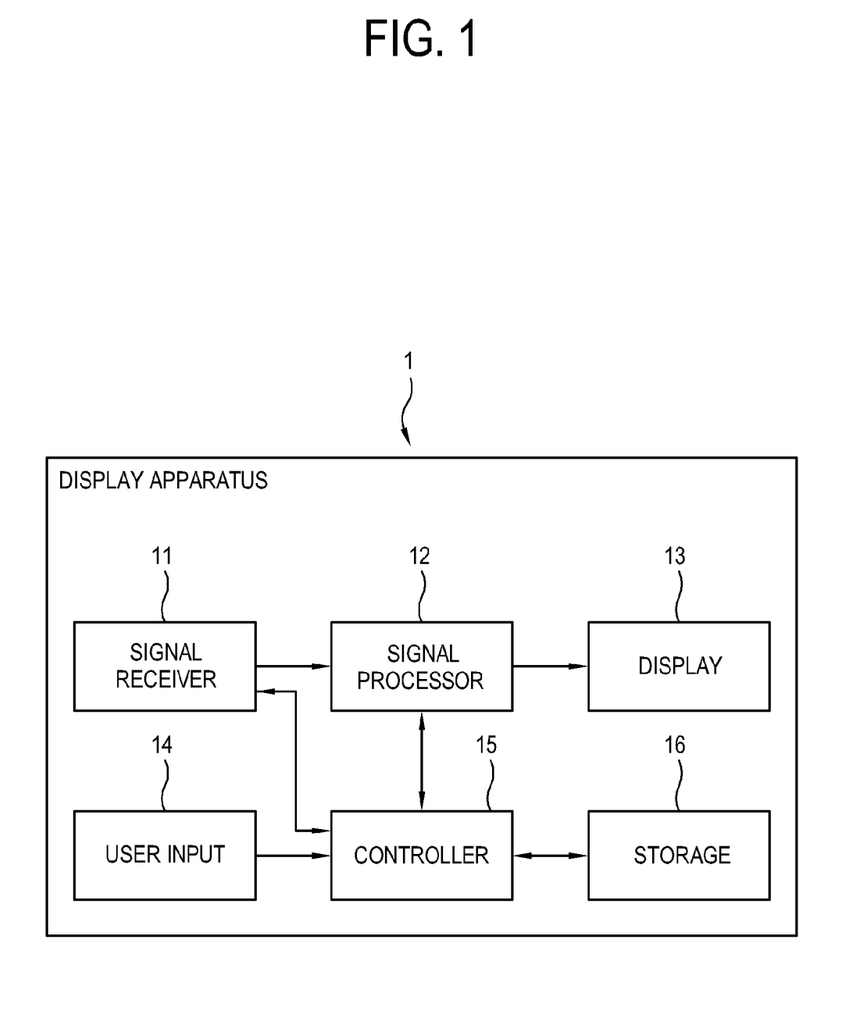
FIG. 1 is a block diagram of a display apparatus according to an exemplary embodiment.

One or more exemplary embodiments relate to a display apparatus that may be a television (TV), a computer, a tablet, a mobile phone, a set-top box, an appliance, and the like. As shown in FIG. 1, the display apparatus 1 includes a signal receiver 11, a signal processor 12, a display 13, a user input 14, a controller 15, and a storage 16.

For example, the display apparatus 1 described herein may include a display, such as a television, a computer monitor, a tablet, and the like. As another example, the display apparatus may connect to another device that includes a display, such as a set-top box, a game console, and the like.

The signal receiver 11 receives a broadcasting signal. For example, the signal receiver 11 may receive a broadcasting signal from a predetermined broadcasting station, a relay device that relays a signal from the broadcasting station, and the like. The broadcasting signal received by the signal receiver 11 may be a wired signal or a wireless signal. The broadcasting signal received by the signal receiver 11 may be a digital signal or an analog signal. For example, the broadcasting signal received by the signal receiver 11 may be a sky wave signal, a cable signal, a satellite signal, a network signal, and the like. As a non-limiting example, the broadcasting signal may be a digital cable TV signal complying with advanced television systems committee (ATSC) and clear quadrature amplitude modulation standards. However, the broadcasting signal is not limited to the foregoing examples.

The signal receiver 11 may receive the broadcasting signal from a plurality of channels under control of the controller 15. The broadcasting signal includes contents that are provided by the broadcasting station. For example, the contents of the broadcasting signal may include a broadcasting program such as a television show, a drama, a movie, news, sports, music, VOD, and the like. The content includes an image, and may further include at least one of sound and additional information.

The broadcasting signal may include information about overlapped channels. The overlapped channels are two or more channels that have the same content but that may be different in a video format from each other. In other words, a plurality of content overlapping channels. For example, an image of a first channel may have a first resolution and an image of a second channel may have a second resolution that is higher than the first resolution with regard to the same the broadcasting program. It should also be appreciated that the video format may include any video attributes such as a codec, an aperture ratio, and the like, that can be displayed in various forms. Therefore, a first channel may have a first channel quality, and a second channel may have a second channel quality that is better than or worse than the first channel quality of the first channel.

The signal processor 12 processes an image signal that is received by the signal receiver 11. The signal processor 12 processes an image signal under control of the controller 15 to detect and extract content and information about the content overlapped channels from the broadcasting signal. The signal processor 12 performs a predetermined signal processing operation corresponding to the standard of the received broadcasting signal and extracts the content and the information about the overlapped channels.

The display 13 displays an image of content extracted by the signal processor 12. For example, the display 13 may include any type of display device such as a liquid crystal display (LCD), a plasma display panel (PDP), an organic light emitting diode (OLED), and the like.

The controller 15 may control the display apparatus 1 based on the extracted information about the overlapped channels. For example, the controller 15 may control one channel from among two overlapped channels so that the channel is not selected by a user based on the information about the overlapped channels. Also, the controller 15 may control the display apparatus 1 to inform a user about information of the overlapped channels. As another example, the controller 15 may control recording or schedule a recording to be performed with regard to one or more channels from among the two or more overlapped channels based on the information about the overlapped channels. The controller 15 may include or may be connected to a nonvolatile memory for storing a control program, a volatile memory for loading the control program, a microprocessor for executing the control program, and the like.

According to various aspects, the display apparatus 1 may operate based on the information about the overlapped channels that is embedded or otherwise included in the received broadcasting signal, and thus, improve a user's convenience. Also, the display apparatus 1 may analyze the information about the overlapped channels that is embedded in the received broadcasting signal, and thus, determine the overlapped channels with a higher reliability.

As shown in FIG. 1, the display apparatus 1 also includes a user input 14 for receiving input from a user. The user input 14 may include a remote signal receiver for receiving a remote control signal that is received from a remote controller based on a user's input. The user input 14 may include a button input provided with at least one button for receiving a user's input. Through the user input 14, a user can select one desired channel among the plurality of channels for the broadcasting signal. As another example, the user input may include a touch pad, a sensor, a speech recognition module, a camera, and the like, which may be used to receive commands and other input from a user.

The display apparatus 1 also includes a storage 16 that may be used to store a computer program and related information for operating the display apparatus 1. For example, the storage 16 may store information for selecting at least one channel among the plurality of channels for the broadcasting signal. The storage 16 may include one or more nonvolatile memories and volatile memories.

FIG. 1 illustrates the display apparatus 1 according to an exemplary embodiment. In other examples, it should be appreciated that the apparatus may exclude at least one from the elements shown in FIG. 1, and may further include an element not shown in FIG. 1. For example, the display apparatus 1 may further include an interface for receiving an image signal from an imaging device such as a digital versatile disc (DVD) player, a personal computer, a set-top box, a camera, and the like. The display apparatus may also include a server connected to a network such as Internet, a wirelessly connected portable terminal such as a smart phone, a smart pad, and the like, an interface for receiving an image signal stored as data in a universal serial bus (USB) storage or the like.

It should also be appreciated that the apparatus is not limited to a display apparatus and may be achieved as a different type of device. For example, the apparatus may be an image processing device excluding the display 13 from the elements shown in FIG. 1. In this case, the image processing device may further include an output for outputting a processed image to a display apparatus in addition to the elements shown in FIG. 1.

Figure 2:
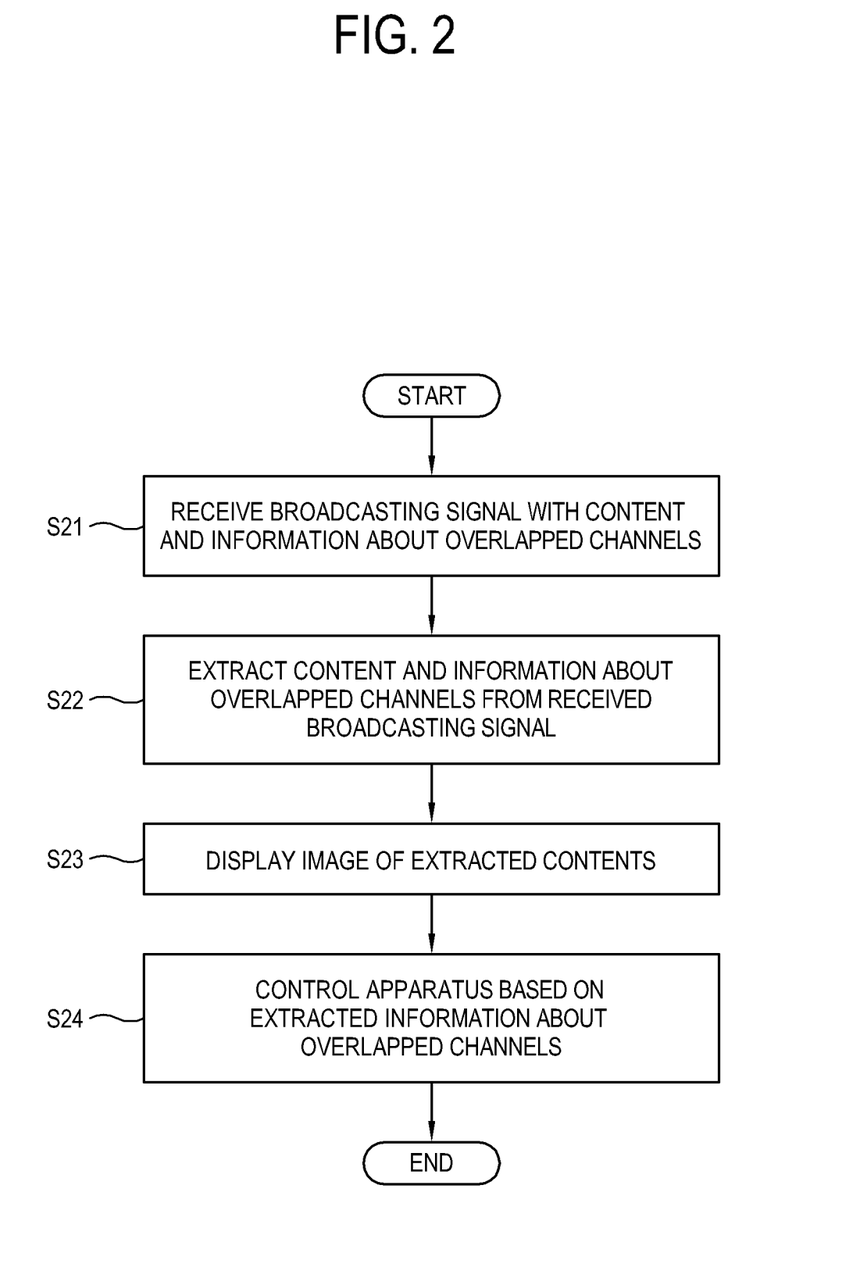
FIG. 2 is a flowchart illustrating a method of controlling a display apparatus according to an exemplary embodiment.

FIG. 2 is a flowchart illustrating a method of controlling a display apparatus according to an exemplary embodiment. The operations of the display apparatus 1 may be performed under the control of the controller 15. In operation S21, the display apparatus 1 receives the broadcasting signal including content and information about overlapped channels from among the plurality of channels. In operation S22, the display apparatus 1 processes the broadcasting signal and extracts the content and the information about the overlapped channels. In operation S23, the display apparatus 1 displays an image of the extracted content. In operation S24, the controller 15 of the display apparatus 1 controls the display apparatus 1 based on the extracted information about the overlapped channels.

As an alternative example of the operations of the display apparatus 1 shown in FIG. 2, the order of the operation S23 of displaying an image of content and the operation 24 of controlling the apparatus based on the information about the overlapped channels may be reversed. As another example, the operation S23 of displaying the image of the content and the operation S24 of controlling the apparatus based on the information about the overlapped channels may be performed or at least partially performed at the same time.

Figure 3:
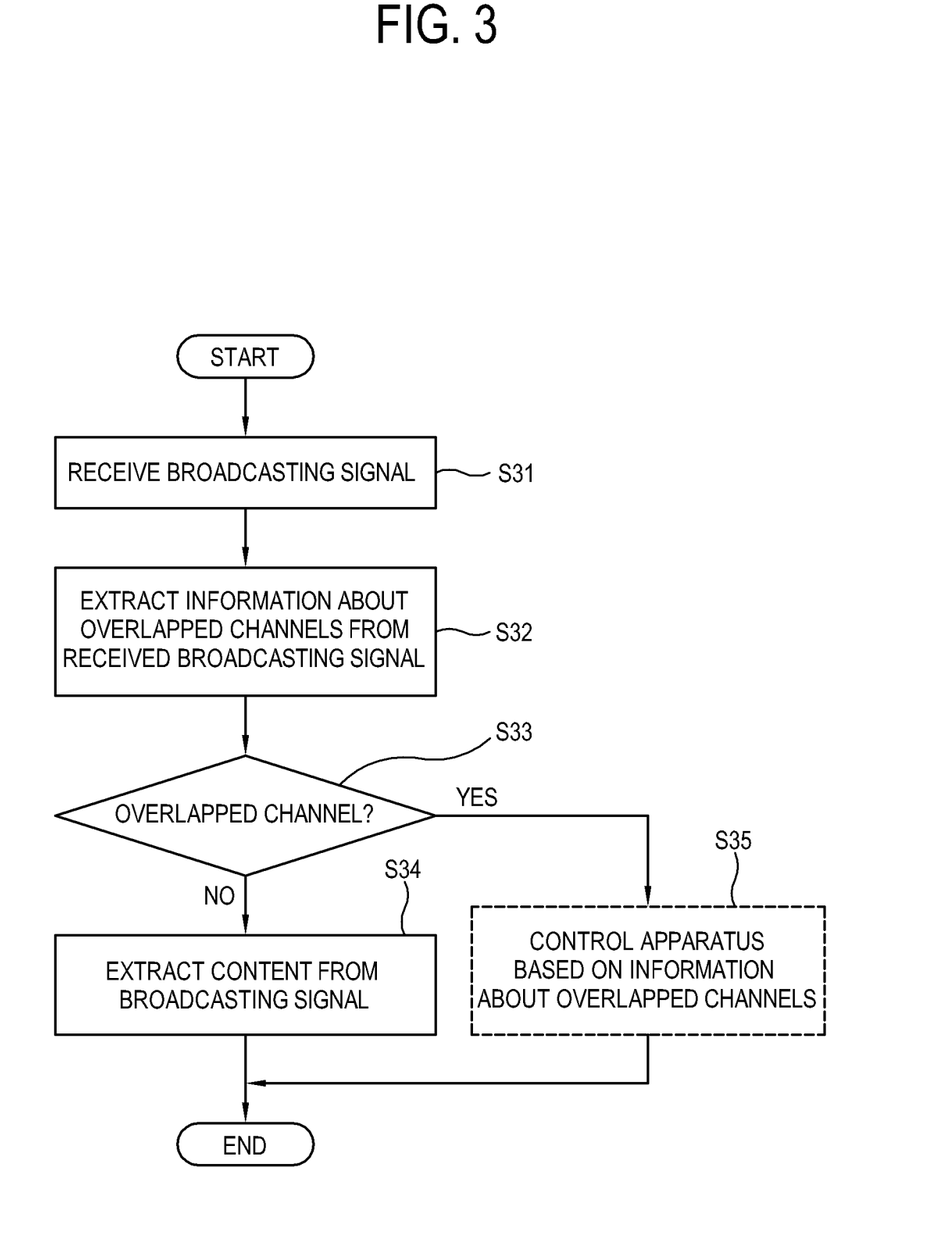
FIG. 3 is a flowchart illustrating a method of controlling a display apparatus according to another exemplary embodiment.

FIG. 3 is a flowchart illustrating a method of controlling the display apparatus according to another exemplary embodiment. In operation S31, the display apparatus 1 receives a broadcasting signal of a channel from among the plurality of channels. In operation S32, the display apparatus 1 extracts information about the overlapped channels from the received broadcasting signal. In this example, the information about the overlapped channels is extracted prior to extracting the content of the broadcasting channel.

In operation S33, the display apparatus 1 determines whether the channel of the corresponding broadcasting signal is an overlapping channel based on the extracted information about the overlapped channels. If the channel is not an overlapped channel, at operation S34 the display apparatus 1 extracts content from the broadcasting signal of the corresponding channel. On the other hand, if the channel of the broadcasting signal is an overlapping channel, the display apparatus 1 does not extract the content from the broadcasting signal of the corresponding channel but instead, at operation S35, the display apparatus 1 controls the apparatus based on the extracted information about the overlapped channels.

For example, the display apparatus 1 may determine channels that are overlapped based on the information about the overlapped channels, and may not extract overlapped contents, thereby preventing an unnecessary operation from being performed.

According to various aspects, the information about the overlapped channels may be assigned to a value of predetermined data field that is included in the broadcasting signal. For example, the broadcasting signal may comply with a program and system information protocol for terrestrial broadcast and cable (PSIP) that is stipulated by the advanced television systems committee (ATSC A/65). In this example, the information about the overlapped channels may be embedded in a virtual channel table (VCT) among transport stream packets of the broadcasting signal. The VCT may include a terrestrial virtual channel table (TVCT) for terrestrial broadcasting, a cable virtual channel table (CVCT) for cable broadcasting, and the like.

Figure 4:
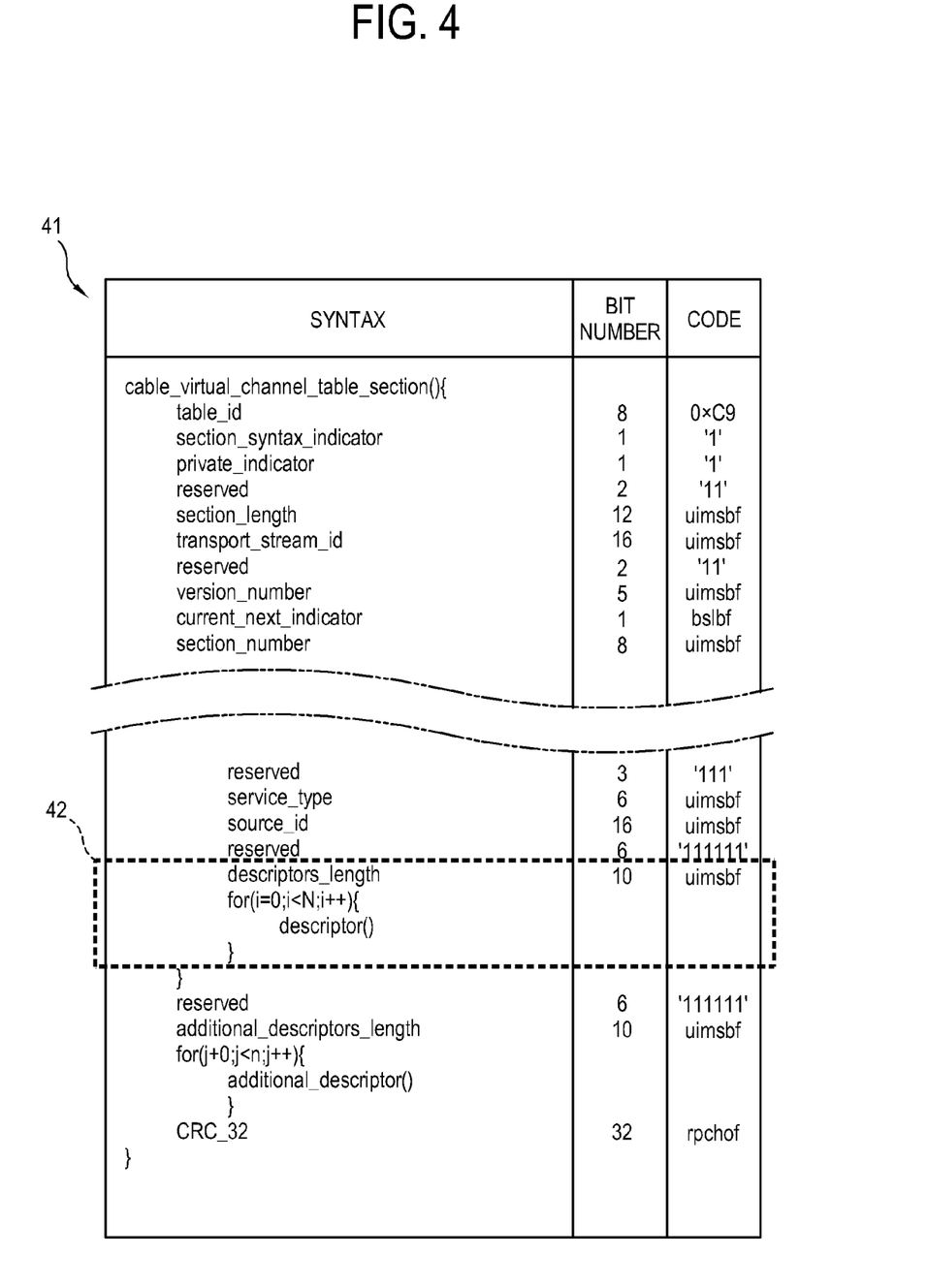
FIG. 4 is a diagram illustrating a bit stream syntax of a cable virtual channel table (CVCT) according to an exemplary embodiment.

FIG. 4 is a diagram illustrating a bit stream syntax of a cable virtual channel table (CVCT) according to an exemplary embodiment. As shown in FIG. 4, a cable virtual channel table (CVCT) 41 of the broadcasting signal includes syntax 42 about a descriptor. The syntax 42 of the descriptor includes a length of the descriptor 'descriptors_length' and contents of the descriptor 'descriptor( )'. For example, the information about the overlapped channels may be included in the contents of the descriptor 'descriptor( )'.

Figure 5:
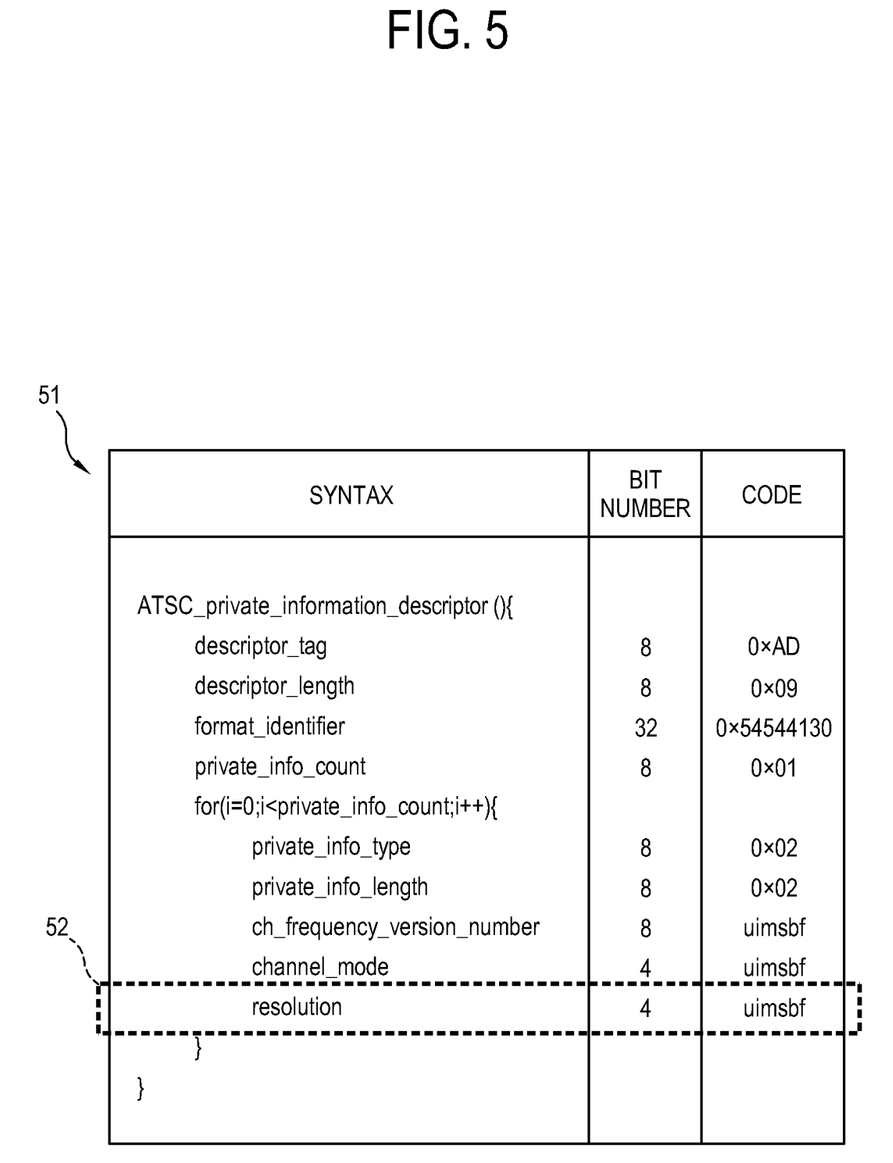
FIG. 5 is a diagram illustrating a bit string syntax including detailed contents of a descriptor according to an exemplary embodiment.

FIG. 5 is a diagram of a bit string syntax illustrating contents of a descriptor according to an exemplary embodiment. As shown in FIG. 5, bit string syntax 51 is an example of a descriptor for clear quadrature amplitude modulation (QAM) digital TV that may be used to provide information about the channel frequency organization version of cable broadcasters that transmit broadcasting signals, encryption of the corresponding channels and video on demand (VOD) channels, an image resolution and whether the same broadcasting is transmitted, and the like.

In this example, the 'descriptor_tag' in bit string syntax 51 indicates that the corresponding descriptor is an 'ATSC_private_information_descriptor', and is represented as 0xAD in an 8-bit field. Also, the term 'descriptor_length' indicates the length of the other descriptor from the field of 'descriptor_length' to the end of the subject descriptor in the form of bytes, and is represented as 0x09 in an 8-bit field. 'format_identifier' uses a value registered to the society of motion picture and television engineers (SMPTE) for using the 'ATSC_private_information_descriptor', and is represented as 0x54544130 in a 32-bit field. The term 'private_info_count' indicates a loop count in 'private_info_loop', and is represented as 0x01 in 8-bit field. Further, 'private_info_type' indicates a descriptor for clear QAM using 'ATSC_private_information_descriptor', and is represented as 0x02 in an 8-bit field, and 'private_info_length' indicates from the other length in units of bytes from the field of 'private_info_length' to each end of 'private_info_loop' and is represented as 0x02 in an 8-bit field In addition, 'ch_frequency_version_number' indicates a value of the channel frequency organization version of the corresponding cable broadcasters, and is represented as a remainder that is obtained by dividing the value with 256 after the value is increased by 1 when the frequency organization of the cable broadcaster is changed. 'ch_frequency_version_number' may be the same value as the descriptor for the clear QAM digital cable TV within the cable virtual channel table (CVCT). 'channel_mode' indicates encryption of the corresponding channel and VOD channel. For example, the display apparatus 1 may allow a user to view only those channels which are not encrypted. If a value of the subject field 'channel_mode' collides with a value of the access_controlled' of the cable virtual channel table (CVCT), the value of the subject field may be given priority. This is effective, for example, when a 'hidden' field of the virtual channel table (CVCT) is not '1'.

Figure 6:
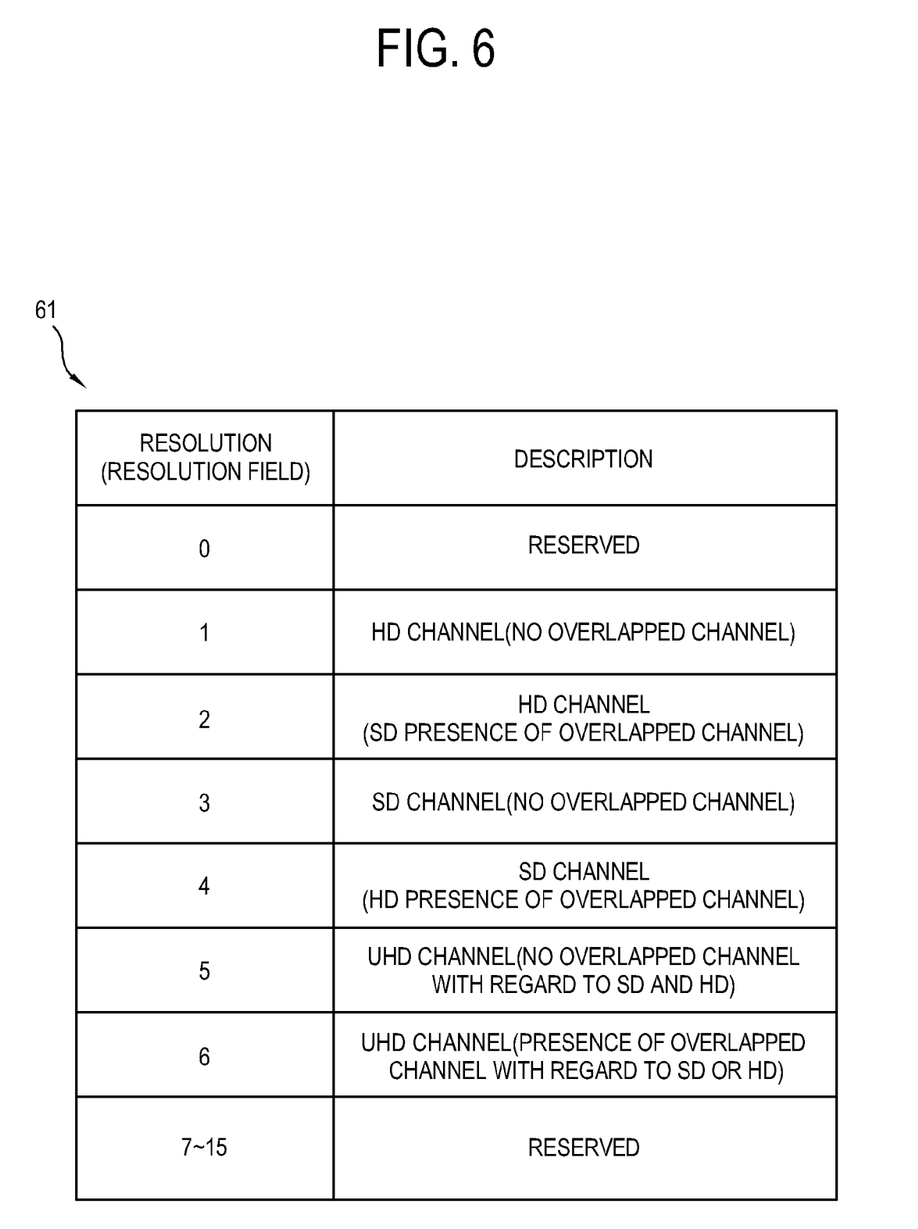
FIG. 6 is a table illustrating values of resolution and their respective descriptions according to an exemplary embodiment.

According to an exemplary embodiment, the information about the overlapped channels may be assigned to a resolution field 52. The resolution field 52 may illustrate a resolution of a corresponding channel, and whether to transmit another channel overlapped with the corresponding channel. FIG. 6 is a table illustrating values of resolution and their descriptions according to an exemplary embodiment. As shown in FIG. 6, the resolution field 61 has values from 0 to 15, and each value is assigned with a resolution of the corresponding channel, and identifies whether another channel overlaps with the corresponding channel. Here, the overlapping channel refers to a channel that is different in resolution from but that has the same contents as the corresponding channel.

For example, when the resolution field 61 has a value of '1', the corresponding channel has a high definition (HD) resolution and no channel overlapped with the corresponding channel. If the resolution field 61 has a value of '2', the corresponding channel has a HD resolution and there is another channel that is overlapped with the corresponding channel and it has a standard (SD) resolution. As another example, if the resolution field 61 has a value of '5', the corresponding channel has an ultra high definition (UHD) resolution and there is no channel overlapped with the corresponding channel. If the resolution field 61 has a value of '6', the corresponding channel has a UHD resolution and there is another channel that overlaps with the corresponding channel and has a SD resolution or an HD resolution.

The display apparatus 1 may determine whether the corresponding channel is an overlapping channel with reference to the values of the resolution field 61. For example, the display apparatus 1 may use the information about the overlapped channels, assigned to a predetermined value of the data field embedded in the broadcasting signal, thereby more effectively determining the overlapped channels.

Figure 7:
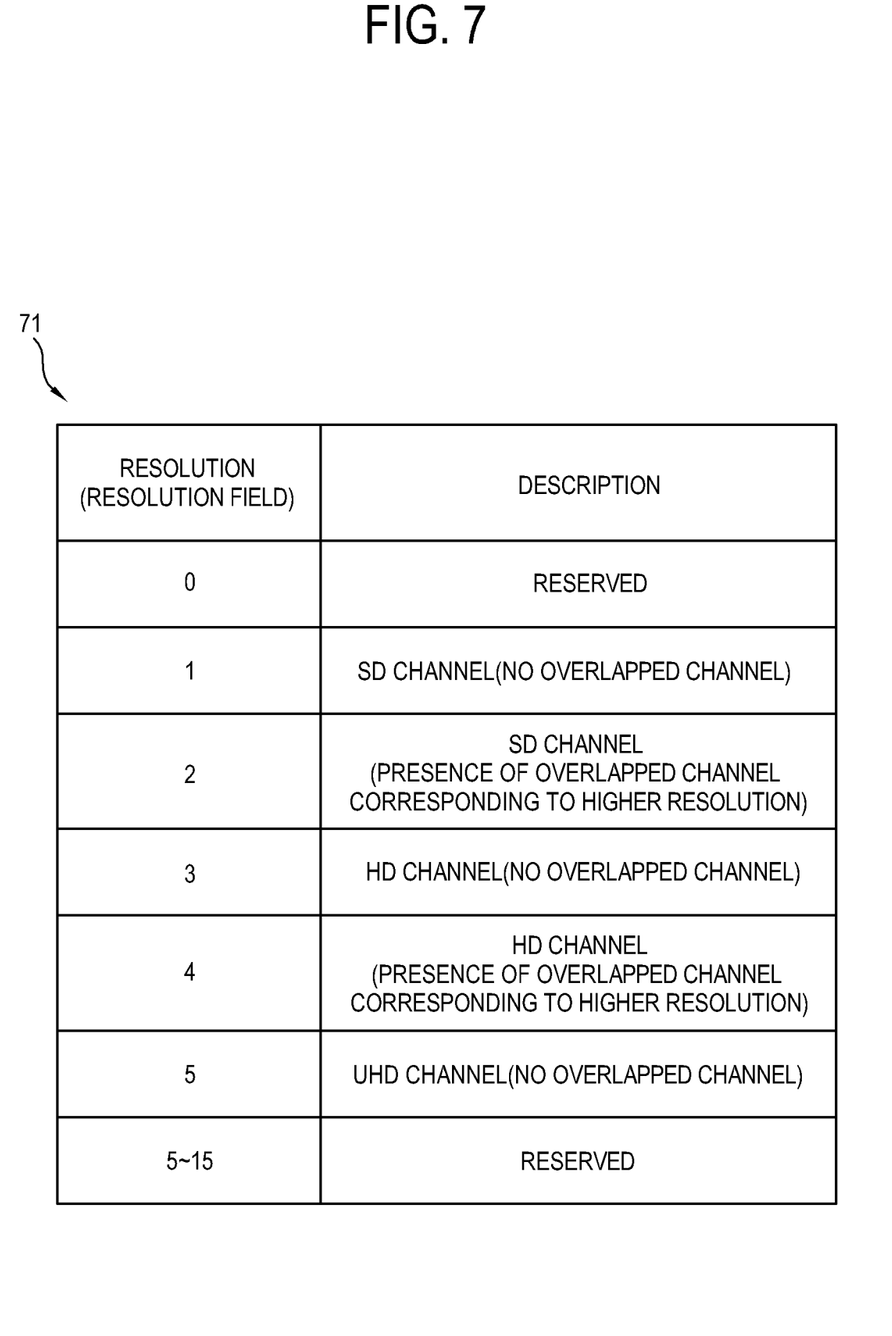
FIG. 7 is a table illustrating values of resolution and their respective descriptions according to another exemplary embodiment.

FIG. 7 is a table illustrating values of resolution and their descriptions according to another exemplary embodiment. In this example, a predetermined rule is applied to the description assigned to each value of the resolution field 71. That is, the value of the resolution field 71 indicates a resolution of a current channel, and may also indicate whether there is an overlapping channel that has a resolution that is higher than a resolution of the current channel (hereinafter, referred to as a 'higher resolution'). In this example, the resolution becomes higher as the value of the resolution field 71 increases, thereby sequentially indicating the presence of the higher resolutions with respect to the current resolution.

For example, as shown in FIG. 7, if the resolution field 71 has a value of '1', the corresponding channel has a standard resolution and there is no overlapped channel corresponding to a higher resolution (e.g., HD or UHD). If the resolution field 71 has a value of '2', the corresponding channel has a standard resolution and there is an overlapped channel that has a higher resolution (e.g., HD or UHD) Likewise, if the resolution field 71 has a value of '3', the corresponding channel has a an HD resolution and there is no overlapped channel corresponding to a higher resolution (e.g., UHD). If the resolution field 71 has a value of '4', the corresponding channel has an HD resolution and there is an overlapped channel that has a higher resolution (e.g., UHD).

In this example, because higher resolution information in comparison to the current resolution is included in the description assigned to each value of the resolution field 71, only a couple of resolution fields 71 are enough to provide the overlapped information. Therefore, it is possible to efficiently provide the information about the overlapped channels without lack of the resolution fields 71. Also, if a preset rule is applied and indicates the presence of the resolutions higher than the current resolution, the broadcasting station and the display apparatus 1 can accurately exchange the information about the overlapped channels with each other and effectively process the information about the overlapped channels.

While the examples herein include descriptions of higher resolutions by way of example, the present disclosure is not limited thereto. Alternatively, the information about the overlapped channels may be variously set up. That is, it is possible to provide the same contents in a plurality of video formats which may be classified into superordinate and subordinate concepts. Accordingly, the presence of the overlapped channels may be assigned to values of a corresponding field in an order from the subordinate video format to the superordinate format, and the like.

Referring to FIGS. 5 through 7, to provide convenience to a user, the display apparatus 1 may not provide at least one of the overlapped channels to a user in accordance with the values of the resolution fields 52, 61 and 71. For example, the display apparatus 1 may include two or more channels among the overlapped channels in a channel configuration (hereinafter, referred to as an overlapped channel configuration). As another example, the display apparatus may include only one channel among the overlapped channels in a channel configuration (hereinafter, referred to as a single channel configuration). The channel configuration refers to a group of channels that can be selected by a user from among a plurality of channels for a broadcasting signal or an operation for determining such a group of channels. Also, the display apparatus 1 may include only a channel that is capable of being processed except for channels having the other resolutions.

In the example of FIG. 7, the display apparatus 1 supporting a resolution of UHD may include the channels having all the resolutions of SD, HD and UHD regardless of the values of the resolution field 71 (i.e., the overlapped channel configuration) in the channel configuration. As an example of the single channel configuration, the display apparatus 1 supporting a resolution of UHD may include a channel that has a resolution of SD, HD or UHD if the resolution field 71 has one value of '1', '3', and '5', because there is not an overlapping channel having a different resolution SD, HD or UHD. As another example, the display apparatus 1 supporting the resolution of UHD may not include a channel having a resolution of SD, HD or UHD if the resolution field 71 has a value of '2' or '4', because there is an overlapped channel having a different resolution of SD, HD or UHD.

As another example, the display apparatus 1 supporting a resolution of HD may include a channel having all supportable resolutions of SD and HD in the channel configuration information if the resolution field 71 has a value of '1', '2', '3' and '4' (i.e., overlapped channel configuration). As another example of a single channel configuration, the display apparatus 1 supporting a resolution of HD may include a channel having a resolution of SD or HD if the resolution field 71 has a value of '1' and '3', because there is no overlapped channel having a different resolution of SD or HD. On the other hand, the display apparatus 1 supporting the resolution of HD may not include a channel having a resolution of SD or HD if the resolution field 71 has a value of '2', '4' and '5', because there is an overlapped channel that has a different resolution of SD or HD or is an unsupportable resolution of UHD.

As another example, the display apparatus 1 supporting a resolution of SD may include a channel having a supportable resolution SD in the channel configuration information if the resolution field 71 has a value of '1' and '2'. On the other hand, the display apparatus 1 supporting the resolution of SD may not include a corresponding channel if the resolution field 71 has a value of '3', '4' and '5', because the channel may be an unsupportable resolution of HD or UHD.

For example, if a user is currently watching content on a channel that has a high definition quality, and the display apparatus identifies another channel supporting the same content, but which is in a standard quality, the display apparatus may not inform the user about the other channel because the other channel has less quality. Similarly, if the display apparatus determines that there is another channel with the same HD quality of the content, the display apparatus may not inform the user about the other channel. However, this is merely for purposes of example and it should be appreciated that the display apparatus may inform a user about any other channel with the same content, for example, based on a user selection.

The display apparatus 1 may store information about the channel configuration in the storage 16. The display apparatus 1 may allow a user to select a channel from among the channels included in the channel configuration, based on the information about the channel configuration stored in the storage 16. For example, if a user selects a channel from among the plurality of channels included in the channel configuration, the display apparatus 1 may receive and display a broadcasting signal of the selected channel. In an example of the single channel configuration, the display apparatus 1 may prevent a user from unnecessarily selecting overlapped channels because information about the channel configuration stored in the storage 16 does not include information about at least one channel among the overlapped channels, thereby improving a user's convenience.

As another example, the display apparatus 1 may modify information about the channel configuration previously stored in the storage 16, based on the information about the overlapped channels. For example, if channel A has a lower resolution than a current channel and is included in the information about the channel configuration previously stored in the storage 16, the display apparatus 1 may delete channel A from the information about the channel configuration and add channel B to the information about the channel configuration previously stored in the storage 16 if it is determined that channel B has a higher resolution based on the information about the overlapped channels.

The display apparatus 1 may inform or otherwise output to a user information about the overlapped channels. For example, the display apparatus 1 may display the information about the overlapped channels through a user interface (UI).

Figure 8:
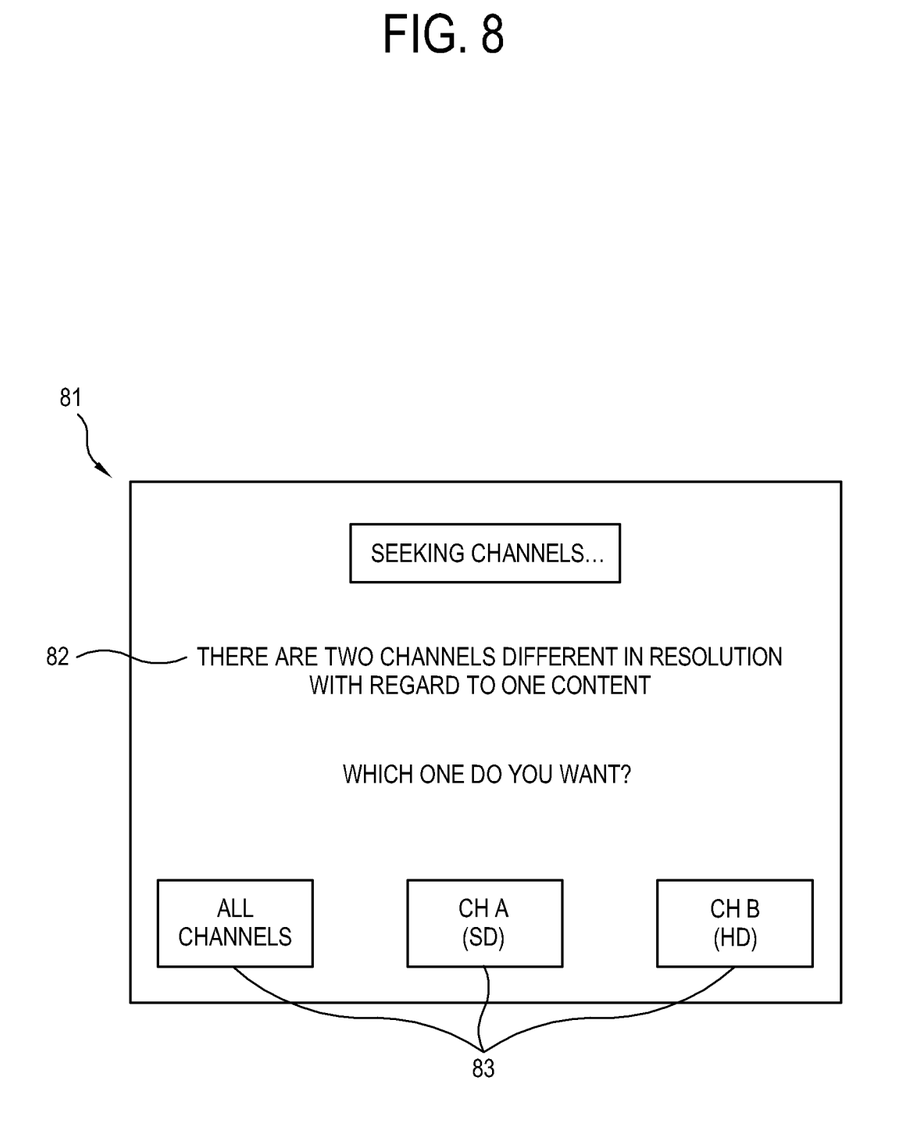
FIG. 8 is a diagram illustrating a user interface (UI) including information about overlapped channels according to an exemplary embodiment.

FIG. 8 is a diagram illustrating a user interface (UI) displaying information about overlapped channels according to an exemplary embodiment. The display apparatus 1 may perform a channel configuration through an automatic channel seeking function. If an overlapped channel is found during the automatic channel seeking process, the display apparatus 1 may display a UI 81 as shown in FIG. 8. For example, the UI 81 may include a message 82 which says that there are two channels Ch A and Ch B and which have a different resolution with regard to the same content. The UI 81 may also include a menu item 83 that allows a user to select a channel among the overlapped channels for the channel configuration. Through the menu item 83, a user may select all the overlapped channels, or select one channel among the overlapped channels. If a user selects one of the menu item 83, the display apparatus 1 change the channel to the channel that is selected through the menu item 83

Figure 9:
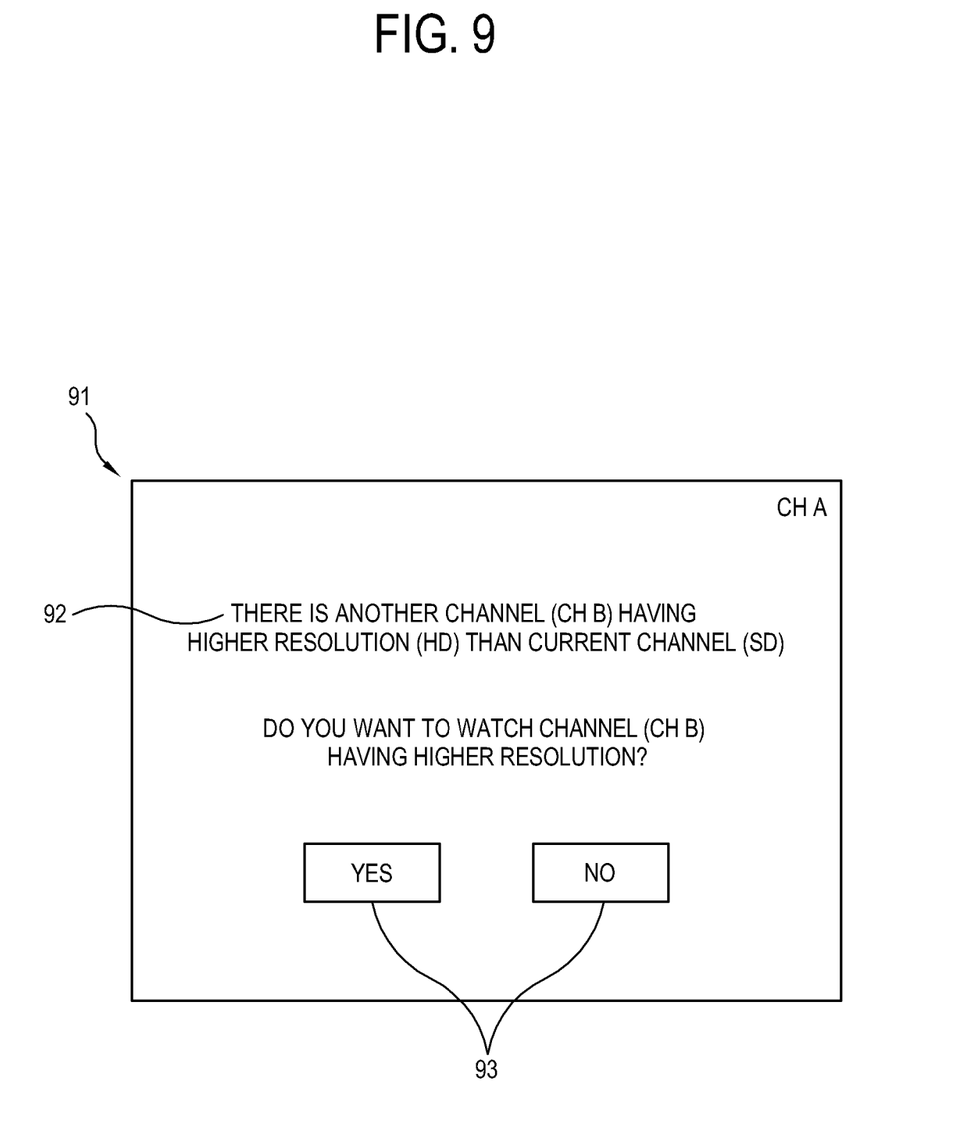
FIG. 9 is a diagram illustrating a UI including information about overlapped channels according to another exemplary embodiment.

FIG. 9 illustrates another example of a UI that includes information about the overlapped channels according to an exemplary embodiment. For example, the display apparatus 1 may display UI 91 as shown in FIG. 9 if it is determined that there is a second channel Ch B that has a higher resolution (such as HD) while displaying content of a first channel Ch A having a lower resolution (such as SD). For example, the UI 91 may include a message 92 which says that there is another channel Ch B that has a higher resolution than the current SD resolution. Also, the UI 91 may include a menu item 93 through which a user may select channel Ch B having the higher resolution of HD. If a user selects channel Ch B through the menu item 93, the display apparatus 1 switches to the selected channel Ch B and displays the content of the higher resolution HD.

Figure 10:
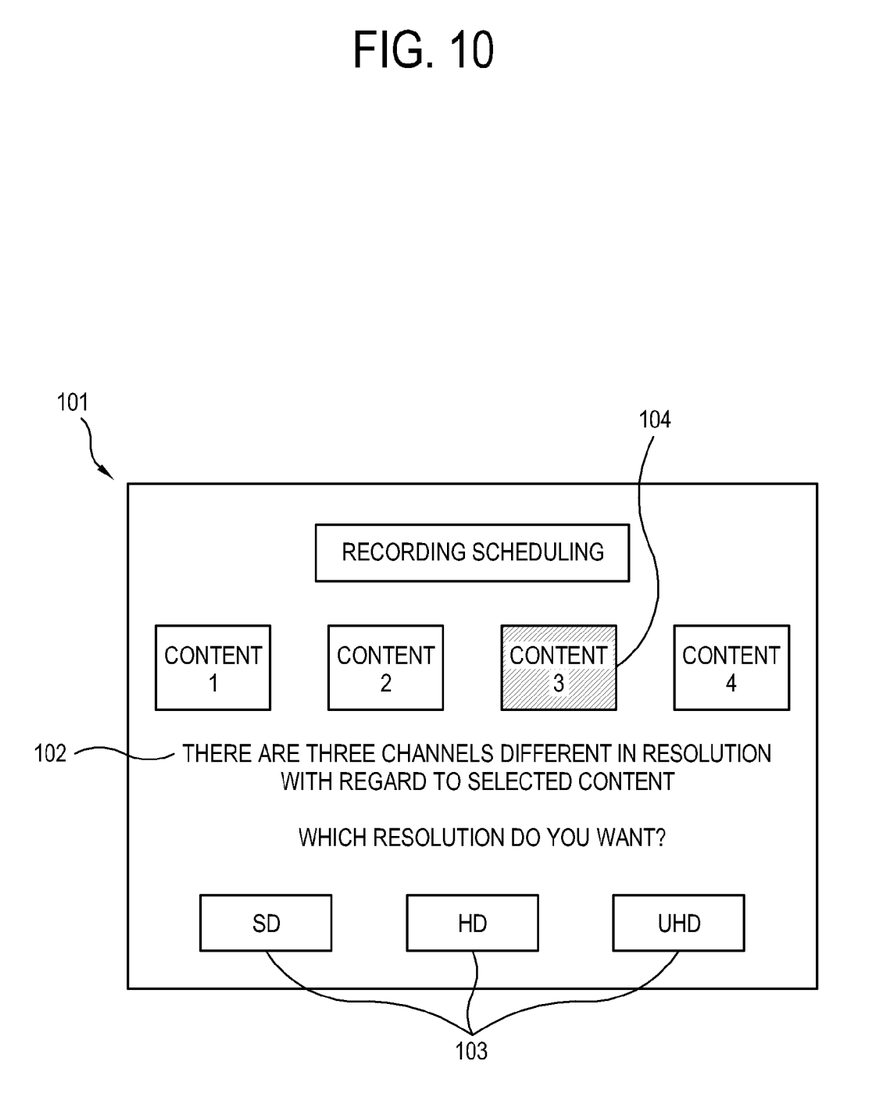
FIG. 10 is a diagram illustrating a UI including information about overlapped channels according to another exemplary embodiment.

FIG. 10 illustrates another example of a UI that includes information about the overlapped channels according to an exemplary embodiment. The display apparatus 1 may perform a scheduled recording function to record predetermined content. For example, the display apparatus 1 may display a UI 101 as shown in FIG. 10 if it is determined that there is an overlapped channel with regard to content selected by a user to be recorded. For example, the UI 101 may include a message 102 which says that there are three channels corresponding to other resolutions SD, HD and UHD with regard to the content 104 selected by a user. UI 101 may also include a menu item 103 through which a user may select a resolution of the content that is scheduled for recording among the plurality of resolutions SD, HD and UHD. If a user selects a resolution from the menu item 103, the display apparatus 1 performs the scheduled recording of the content 104 from a channel corresponding to the selected resolution.

According to various aspects, it is possible to provide information about content overlapped channels or operate based on information about the content overlapped channels, thereby improving a user's convenience.

The methods described above can be written as a computer program, a piece of code, an instruction, or some combination thereof, for independently or collectively instructing or configuring a processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

Although a few exemplary embodiments have been shown and described, it will be appreciated by those skilled in the art that changes may be made in these exemplary embodiments without departing from the principles and spirit thereof. Therefore, the foregoing should be considered as illustrative only. The scope of the description is defined in the appended claims and their equivalents. Accordingly, all suitable modification and equivalents may fall within the scope.

What is claimed is:

1. A display apparatus comprising:
a signal receiver configured to receive a broadcasting signal corresponding to a channel selected from among a plurality of channels, the broadcasting signal comprising image data corresponding to a content of the selected channel and resolution information about the selected channel, the resolution information indicating a resolution of the selected channel and whether a content overlapped channel having a resolution different from the resolution of the selected channel exists;
a signal processor configured to extract the image data of the content and the resolution information about the selected channel from the received broadcasting signal;
a display configured to display an image based on the extracted image data of the content; and
a controller configured to perform a control operation based on the extracted resolution information about the selected channel indicating the resolution of the selected channel and whether the content overlapped channel exists,
wherein the resolution information has a hit value in a single field of a table, indicating both the resolution of the selected channel and whether the content overlapped channel exists, and wherein the bit value is selected from among a plurality of bit values.

2. The display apparatus according to claim 1, wherein the control operation comprises generating a channel configuration comprising information about at least two of the content overlapped channels.

3. The display apparatus according to claim 1, wherein the control operation comprises controlling the display to display a user interface that comprises information about at least two of the content overlapped channels for user selection, said user interface being displayable based on the resolution information.

4. The display apparatus according to claim 1, wherein the control operation comprises scheduling a recording operation with regard to one channel from among at least two of the content overlapped channels.

5. The display apparatus according to claim 1, wherein the resolution information about the selected channel indicating whether the content overlapped channel exists is assigned to a data field included in the broadcasting signal.

6. The display apparatus of claim 1, wherein the receiver is configured to receive the resolution information about the selected channel indicating whether the content overlapped channel exists from a single channel from among a plurality of channels.

7. The apparatus of claim 1, wherein the signal processor is configured to extract the content and the information about the content overlapped channels from the received broadcasting signal, wherein the content and the information about the content overlapped channels occur in a common channel stream.

8. The apparatus of claim 7, wherein the signal processor is configured to search for tunable channels among multiple broadcasting signals, and extracting the content and extracting the information about the content of overlapped channels occurs during the search for tunable channels.

9. The apparatus of claim 8, wherein the controller is configured to determine a single channel for channel display from among the detected plurality of channels providing the same content, the single channel for channel display being based on a quality of the channel providing a highest quality resolution among the plurality of channels providing the same content.

10. The display apparatus of claim 1, the resolution information is represented by only one bit.

11. The display apparatus according to claim 1, wherein the plurality of bit values of the resolution information indicating the resolution of the selected channel and whether the content overlapped channel exists comprise:
a first bit value indicating the resolution of the selected channel and that the content overlapped channel exists; and
a second bit value indicating the resolution of the selected channel and that the content overlapped channel does not exist.

12. The display apparatus according to claim 11, wherein the content overlapped channel indicated by the first bit value has only a higher resolution than the selected channel.

13. A control method of a display apparatus, the method comprising:
receiving a broadcasting signal corresponding to a channel selected from among a plurality of channels, the broadcasting signal comprising image data corresponding to a content of the selected channel and resolution information about the selected channel, the resolution information indicating a resolution of the selected channel and whether a content overlapped channel having a resolution different from the resolution of the selected channel exists;
extracting the image data of the content and the resolution information about the selected channel from the received broadcasting signal;
displaying an image based on the extracted image data of the content; and
performing a control operation based on the extracted resolution information about the selected channel indicating the resolution of the selected channel and whether the content overlapped channel exists,
wherein the resolution information has a bit value in a single field of a table, indicating both the resolution of the selected channel and whether the content overlapped channel exists, and wherein the bit value is selected from among a plurality of bit values.

14. The method according to claim 13, wherein the performing the control operation comprises generating a channel configuration comprising information about at least two of the content overlapped channels.

15. The method according to claim 13, wherein the performing the control operation comprises displaying a user interface that comprises information about at least two of the content overlapped channels for user selection, said user interface being displayable based on the resolution information.

16. The method according to claim 13, wherein the performing the control operation comprises scheduling a recording operation with regard to one channel from among at least two of the content overlapped channels.

17. The method according to claim 13, wherein the resolution information about the selected channel indicating whether the content overlapped channel exists is assigned to a data field included in the broadcasting signal.

18. The display apparatus according to claim 13, wherein the plurality of bit values of the resolution information indicating the resolution of the selected channel and whether the content overlapped channel exists comprise:
a first bit value indicating the resolution of the selected channel and that the content overlapped channel exists; and
a second bit value indicating the resolution of the selected channel and that the content overlapped channel does not exist.

19. The display apparatus according to claim 18, wherein the content overlapped channel indicated by the first bit value has only a higher resolution than the selected channel.

20. An apparatus for controlling the output of a plurality of channels including overlapping content, the apparatus comprising:
a processor configured to determine a plurality of channels providing a same content at different image qualities; and
a controller configured to output, to a display, information identifying the plurality of channels providing the same content at different image qualities, and
further comprising a receiver configured to receive a plurality of broadcasting signals corresponding to the plurality of channels,
wherein the processor is configured to detect the same content being provided based on resolution information which is embedded in at least one signal of the plurality of broadcasting signals, the at least one signal also indicating overlapping content, and wherein the different image qualities comprise different resolution,
wherein the at least one signal has a bit value in a single field of a table, indicating both the resolution of the selected channel and whether the content overlapped channel exists, and wherein the bit value is selected from among a plurality of bit values.

21. The apparatus of claim 20, wherein the different image qualities comprise different resolutions.

22. The apparatus of claim 20, wherein the different image qualities comprise at least two of standard definition (SD), high definition (HD), and ultra high definition (UHD).

23. The apparatus of claim 20, wherein the determined plurality of channels are providing a same show, a same movie, or a same program, but at different resolutions.

24. The apparatus of claim 20, wherein information about content overlapping channels are embedded in a virtual channel table (VCT) field included in at least one signal of the detected plurality of channels.

25. The apparatus of claim 20, wherein the controller is configured to determine a single channel for channel display from among the detected plurality of channels providing the same content, the single channel for channel display being based on a quality of the channel providing a highest resolution output among the plurality of channels providing the same content.

26. The display apparatus according to claim 20, wherein the plurality of bit values of the resolution information indicating the resolution of the selected channel and whether the content overlapped channel exists comprise:
- a first bit value indicating the resolution of the selected channel and that the content overlapped channel exists; and
- a second bit value indicating the resolution of the selected channel and that the content overlapped channel does not exist.

27. The display apparatus according to claim 26, wherein the content overlapped channel indicated by the first bit value has only a higher resolution than the selected channel.

\* \* \* \* \*